US009800031B2

(12) United States Patent
Irons et al.

(10) Patent No.: US 9,800,031 B2
(45) Date of Patent: Oct. 24, 2017

(54) MULTI-POSITION INPUT CORD ASSEMBLY FOR A POWER DISTRIBUTION UNIT

(71) Applicant: Server Technology, Inc., Reno, NV (US)

(72) Inventors: Travis Irons, Reno, NV (US); Mark Ramsey, Reno, NV (US); Chris Connolly, Reno, NV (US)

(73) Assignee: Server Technology, Inc., Reno, NV (US)

( * ) Notice: Subject to any disclaimer, the term of this patent is extended or adjusted under 35 U.S.C. 154(b) by 0 days.

(21) Appl. No.: 14/168,337

(22) Filed: Jan. 30, 2014

(65) Prior Publication Data
US 2014/0144670 A1 May 29, 2014

Related U.S. Application Data

(63) Continuation-in-part of application No. 13/952,234, filed on Jul. 26, 2013, now Pat. No. 9,438,017.
(Continued)

(51) Int. Cl.
*H01R 13/46* (2006.01)
*H02G 3/08* (2006.01)
(Continued)

(52) U.S. Cl.
CPC ........... *H02G 3/08* (2013.01); *H01R 13/5841* (2013.01); *H02G 3/06* (2013.01); *H02G 3/0616* (2013.01); *H02G 11/00* (2013.01); *H02G 3/083* (2013.01)

(58) Field of Classification Search
CPC .... H01R 13/506; H01R 13/595; H01R 13/56; H01R 13/512; H01R 13/59; H01R 35/00;
(Continued)

(56) References Cited

U.S. PATENT DOCUMENTS 3,950,052 A 4/1976 Walter et al.
4,003,616 A 1/1977 Springer
(Continued)

FOREIGN PATENT DOCUMENTS

CN 201243153 Y 5/2009
JP 2000252006 A 9/2000
(Continued)

OTHER PUBLICATIONS

International Search Report and Written Opinion of International Application No. PCT/US2013/052345; dated Nov. 18, 2013; 10 pages.
(Continued)

*Primary Examiner* — Pete Lee
(74) *Attorney, Agent, or Firm* — Perkins Coie LLP

(57) ABSTRACT

Apparatuses and devices are provided that allow for a power input cord to be placed in two or more different orientations relative to a power distribution unit. A power distribution unit may be provided with one or more input cord assemblies that allow an input cord to be swiveled such that the cord exits an outside plane of the power distribution unit at a different angle. Such an assembly allows a power distribution unit to be placed in an equipment rack and coupled with an input power source in a flexible and convenient manner. Clearances and dimensions of equipment racks may be modified to provide enhanced space usage, efficiency, and/or density in a facility.

26 Claims, 14 Drawing Sheets

Related U.S. Application Data

(60) Provisional application No. 61/675,921, filed on Jul. 26, 2012.

(51) Int. Cl.
*H01R 13/58* (2006.01)
*H02G 3/06* (2006.01)
*H02G 11/00* (2006.01)

(58) Field of Classification Search
CPC ...... H01R 35/04; H01R 39/64; H01R 12/596; H01R 12/526; H01R 12/707; H01R 43/0235; H01R 43/0256; H01R 13/5841; H02G 15/06; H02G 15/076; H02G 3/088; H02G 3/16; H02G 3/08; H02G 3/083; H02G 11/00; H02G 3/06; H05K 7/1461; B60R 16/0207; H01B 7/0045
USPC ............ 439/466, 447, 310, 98, 83; 174/542, 174/72 A, 60, 86, 87, 535, 494
See application file for complete search history.

(56) References Cited

U.S. PATENT DOCUMENTS

| | | | |
|---|---|---|---|
| 4,106,831 A | | 8/1978 | Albrecht |
| 4,959,021 A | | 9/1990 | Byrne |
| 5,697,806 A | * | 12/1997 | Whiteman et al. ............ 439/417 |
| 5,735,707 A | * | 4/1998 | O'Groske .......... H01R 13/5841 439/446 |
| 6,027,352 A | | 2/2000 | Byrne |
| 6,123,573 A | * | 9/2000 | Savicki, Jr. ........ H01R 13/5812 439/466 |
| 6,152,639 A | | 11/2000 | Hsu et al. |
| 6,220,889 B1 | * | 4/2001 | Ely et al. ...................... 439/446 |
| 7,043,543 B2 | | 5/2006 | Ewing et al. |
| 7,074,087 B2 | | 7/2006 | Szczesny et al. |
| 7,614,903 B1 | * | 11/2009 | Huang ................. H01R 13/562 439/362 |
| 7,952,030 B2 | * | 5/2011 | Ho .................... H01R 13/5804 138/110 |
| 7,990,689 B2 | | 8/2011 | Ewing et al. |
| 8,198,533 B2 | | 6/2012 | Terada et al. |
| 8,321,163 B2 | | 11/2012 | Ewing et al. |
| 8,450,874 B2 | * | 5/2013 | Ratcliff et al. ................. 307/34 |
| 8,494,661 B2 | | 7/2013 | Ewing et al. |
| 8,662,902 B1 | | 3/2014 | Lai |
| 8,847,759 B2 | | 9/2014 | Bisesti et al. |
| 8,876,548 B2 | * | 11/2014 | Doorhy ............... H01R 25/006 174/53 |
| 8,894,420 B2 | * | 11/2014 | Schichl ............. H01R 13/5841 439/39 |
| 2010/0163279 A1 | | 7/2010 | Ho et al. |
| 2012/0028498 A1 | * | 2/2012 | Na .......................... G09F 3/205 439/491 |

FOREIGN PATENT DOCUMENTS

| | | |
|---|---|---|
| KR | 20-1998-0055269 U | 7/1998 |
| KR | 10-0843665 B1 | 7/2008 |
| KR | 20100099608 A | 9/2010 |
| KR | 20120011767 A | 2/2012 |

OTHER PUBLICATIONS

International Preliminary Report on Patentability of International Application No. PCT/US2013/052345; dated Jan. 27, 2015; 7 pages.

* cited by examiner

MULTI-POSITION INPUT CORD ASSEMBLY FOR A POWER DISTRIBUTION UNIT

CROSS-REFERENCE TO RELATED APPLICATION(S)

This application is a continuation-in-part of U.S. patent application Ser. No. 13/952,234, filed on Jul. 26, 2013, and titled "MULTI-POSITION INPUT CORD ASSEMBLY FOR A POWER DISTRIBUTION UNIT," which claims priority benefit to U.S. Provisional Patent Application Ser. No. 61/675,921, filed on Jul. 26, 2012, and entitled "MULTI-POSITION INPUT CORD ASSEMBLY FOR A POWER DISTRIBUTION UNIT," the entire disclosures of which are incorporated herein by reference.

FIELD

The present disclosure is directed to power distribution units and, more specifically, to a power distribution unit having a multi-position power input.

BACKGROUND

A conventional Power Distribution Unit (PDU) is an assembly of electrical outlets (also called receptacles) that receive electrical power from a source and distribute the electrical power to one or more separate electronic appliances. Each such unit has a power input that receives power from a power source, and power outlets cords that may be used to provide power to electronic appliances. PDUs are used in many applications and settings such as, for example, in or on electronic equipment racks. One or more PDUs are commonly located in an equipment rack (or other cabinet), and may be installed together with other devices connected to the PDU such as environmental monitors, temperature and humidity sensors, fuse modules, or communications modules that may be external to or contained within the PDU housing. A PDU that is mountable in an equipment rack or cabinet may sometimes be referred to as a Cabinet PDU, or "CDU" for short.

A common use of PDUs is supplying operating power for electrical equipment in computing facilities, such as data centers or server farms. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices are aligned vertically one on top of the other in the rack. One or more PDUs may be used to provide power to the electronic equipment. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

As mentioned, many equipment racks may be located in a data center or server farm, each rack having one or more associated PDUs. Various different equipment racks may have different configurations, including different locations of sources of input power. One or more such data centers may serve as data communication hubs for an enterprise. As will be readily recognized, space within equipment racks is valuable with maximization of computing resources for any given volume being desirable.

SUMMARY

Apparatuses and devices are provided that allow for a power input cord to be placed in two or more different orientations relative to a power distribution unit. A power distribution unit may be provided with one or more input cord assemblies that allow an input cord to be swiveled such that the cord exits an outside plane of the power distribution unit at an angle, relative to a longitudinal axis of the power distribution unit. Such an assembly allows a power distribution unit to be placed in an equipment rack and coupled with an input power source in a flexible and convenient manner. Clearances and dimensions of equipment racks may be modified to provide enhanced space usage, efficiency, and/or density in a facility.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

The following patents and patent applications are incorporated herein by reference in their entirety: U.S. Pat. No. 7,043,543, entitled "Vertical-Mount Electrical Power Distribution Plugstrip," issued on May 9, 2006; U.S. Pat. No. 7,990,689, entitled "Power Distribution Unit And Methods Of Making And Use Including Modular Construction And Assemblies," issued on Aug. 2, 2011; U.S. patent application Ser. No. 12/344,419, entitled "Power Distribution, Management, and Monitoring Systems," and filed on Dec. 26, 2008; and U.S. patent application Ser. No. 12/717,879, entitled "Monitoring Power-Related Parameters in a Power Distribution Unit," and filed on Mar. 4, 2010.

Systems and devices are described in which a power input cord, for a power distribution unit (PDU), can be placed in two or more different orientations relative to the PDU housing. A PDU may be provided with one or more input cord assemblies that allow an input cord to be swiveled, such that the cord may exit an outside plane of the PDU at different angles. Such an assembly allows a PDU to be placed in an equipment rack and coupled with an input power source in a flexible and convenient manner. With use of the disclosed assembly, clearances and dimensions of equipment racks may be modified to provide enhanced space usage, efficiency, and/or density in a facility. Such an input cord assembly may also allow for more efficient packaging of PDUs for shipment.

Figure 1:
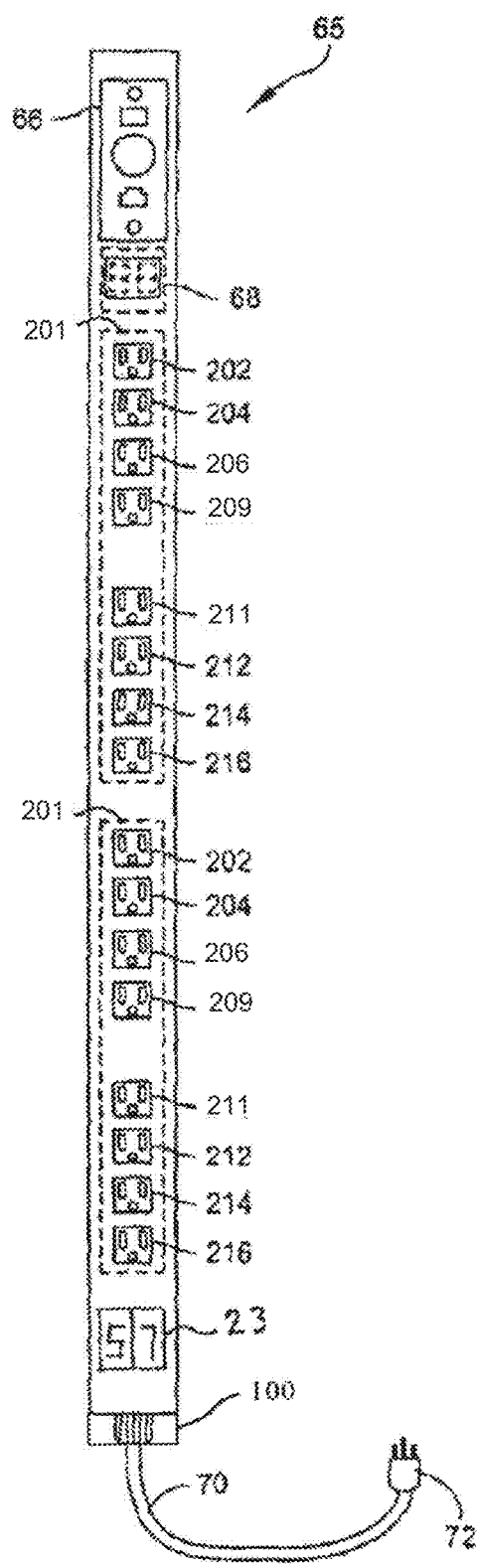
FIG. 1 is an illustration of a face of a power distribution unit in accordance with various embodiments.

FIG. 1 is an illustration of a PDU 65 that includes a swivel input cord assembly 100, Intelligent Power Modules ("IPMs") 201, a communications module 66 that provides communications functions, an environmental monitor port 68, and an input power cord 70 with associated plug 72. The PDU 65, according to this embodiment, includes a housing that is vertically mountable in an equipment rack, although it will be understood that other form factors may be used, such as a horizontally mountable housing. The IPMs 201 each include eight outlets 202, 204, 206, 209, 211, 212, 214, and 216 that supply power to assets that may be mounted into an equipment rack. Such equipment racks are well known, and often include several individual assets that are used in operation of a data center. As is well known, numerous equipment racks may be included in a data center, and in various embodiments each asset in each equipment rack may be monitored for power usage through one or more associated IPMs 201. The visual display 23 (shown displaying the numeral "57") is disposed in the PDU 65 (although in other embodiments the display might be external to the PDU 65), may display multiple items of information and/or may include multiple separate displays.

The input cord assembly 100, according to various embodiments, includes a swivel assembly that allows the input power cord 70 to exit a plane of the PDU housing at one of multiple different angles. Such an assembly 100 allows the input power cord 70 to be situated or positioned to reduce bends in the power cord 70, or to allow bends to be made more easily when connecting the input power cord 70 to a power source. As will be appreciated, equipment racks may have input power provided to the racks in various different locations and orientations. Depending upon where the power source is located in a particular rack, the input power cord 70 may need to extend, for example, from either a front face of the PDU housing or from an end of the PDU housing. Thus, PDU configurations may be specifically selected based on the location in an equipment rack for the power source. If such a PDU is later desired to be placed in a different rack, it may not be usable, or may require modification, if the different rack has input power provided at a different location or with a different configuration. PDUs provided with an input cord assembly 100 may allow for the input cord 70 to be moved relative to the PDU housing, thus allowing such a PDU to be used in a number of different applications as compared to a PDU which does not have such an input cord assembly 100. Furthermore, such a feature may allow for fewer part numbers and fewer required option selections for suppliers and buyers of PDUs. Additionally, such an input cord assembly 100 may allow the input power cord 70 to be more conveniently placed in a shipping box for shipment of the PDU, and may allow for a reduced sized shipping box and/or reduced shipping materials when shipping such a PDU. As will be recognized, a reduced size and/or weight box may also result in reduced costs for shipping.

With continued reference to FIG. 1, some other elements of the PDU 65 are described. In one embodiment, the IPM 201 includes eight outlets (202-216), each of NEMA 5-20R type, contained in a housing. It will be understood that this embodiment, and other embodiments described herein as having NEMA 5-20R type outlets, are exemplary only and that any of various other types of outlets can alternatively be used. For example, the "outlets" can be other NEMA types (e.g., NEMA 5-15R, NEMA 6-20R, NEMA 6-30R or NEMA 6-50R) or any of various IEC types (e.g., IEC C13 or IEC C19). It also will be understood that all "outlets" in a particular power outlet module or IPM 201, or other module-outlets described herein, need not be identical or oriented uniformly along the PDU. It also will be understood that the "outlets" are not limited to three-prong receptacles; alternatively, one or more of the "outlets" can be configured to receive more or less than three-prong mating male connectors. It also will be understood that the "outlets" are not limited to having female prong receptacles. In any "outlet," one or more of the "prong receptacles" can be male instead of or in combination with female connection elements, according to alternative embodiments. In general, as used herein, female and male "prong receptacles" are termed "power-connection elements". Furthermore, the principles described herein also are applicable to devices that may be hard-wired into an outlet module. While the outlet module 201 of this embodiment includes eight outlets, it will be understood that this is but one example and that an outlet module may include a different number of outlets.

The housing for an outlet module may be any suitable housing for such a device, as is known to one of skill in the art, and may be assembled with other modules in a PDU. Such a housing generally includes a front portion, e.g., a front wall, and a rear portion, e.g., a rear wall, the front portion is substantially planar, and the rear portion is substantially planar and parallel to the front portion. The housing also includes longitudinally extending side portions, e.g., side walls, and one or more transverse end portions, e.g., end walls. The front portion, rear portion, side portions, and end portion(s) are generally orthogonal to each other in a generally rectangular or box-type configuration. The housing can be made of any suitable, typically rigid, material, including, for example, a rigid polymeric ("plastic") material. In at least certain embodiments, the front and rear portions are made from an electrically insulating material, whereas in other embodiments conducting materials are used for safe ground bonding. The side portions and the end portion(s) may be integrally formed along with the front portion or the rear portion. Furthermore, while the outlet module described in this embodiment includes a housing, other embodiments may include an outlet module that does not include a housing. For example, an outlet module may include a number of outlets coupled together with no exterior housing, so the outlet module may be installed into another piece of equipment. Each outlet 202-216 is interconnected to a power source through any of a number of well-known connection schemes, such as spade connectors, lug connectors, plug connectors, screw connectors, or other suitable types of connectors. Furthermore, if desired, one or more of these electrical connectors can be located inside the housing or outside the power outlet module housing (when included).

Figure 2:
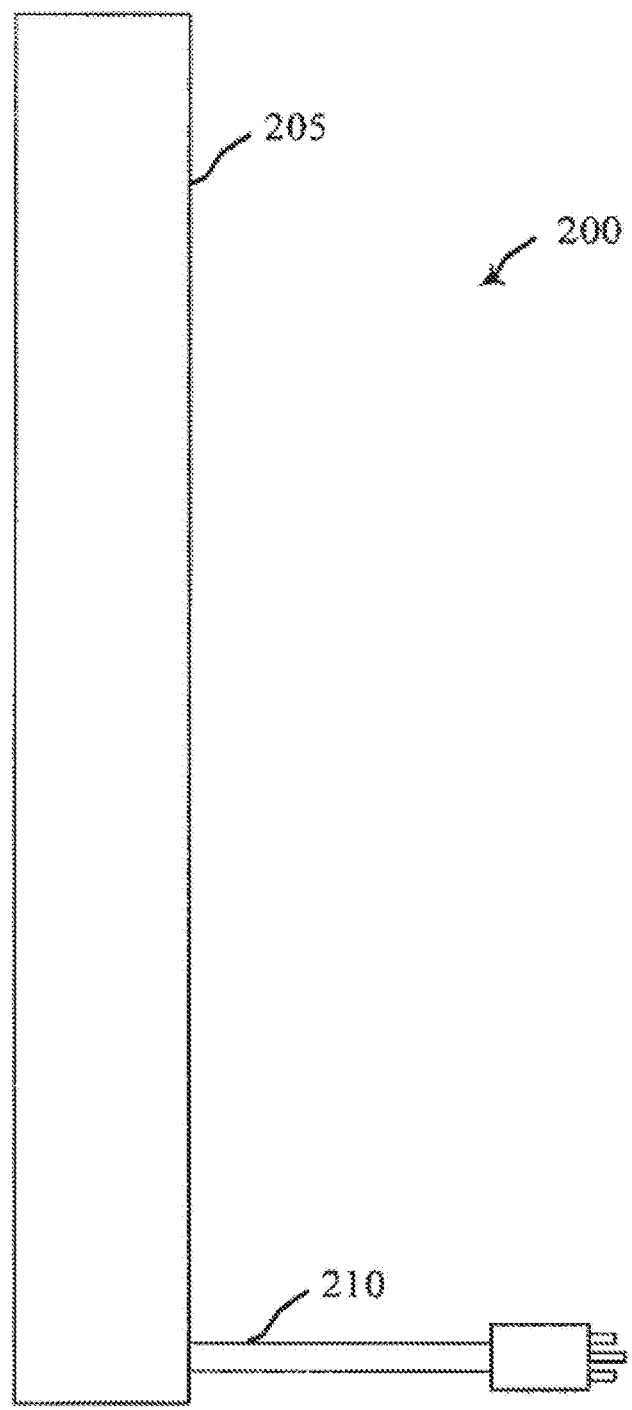
FIGS. 2-4 illustrate a power distribution unit with a cord positioned in various different positions relative to the PDU housing.
Figure 3:
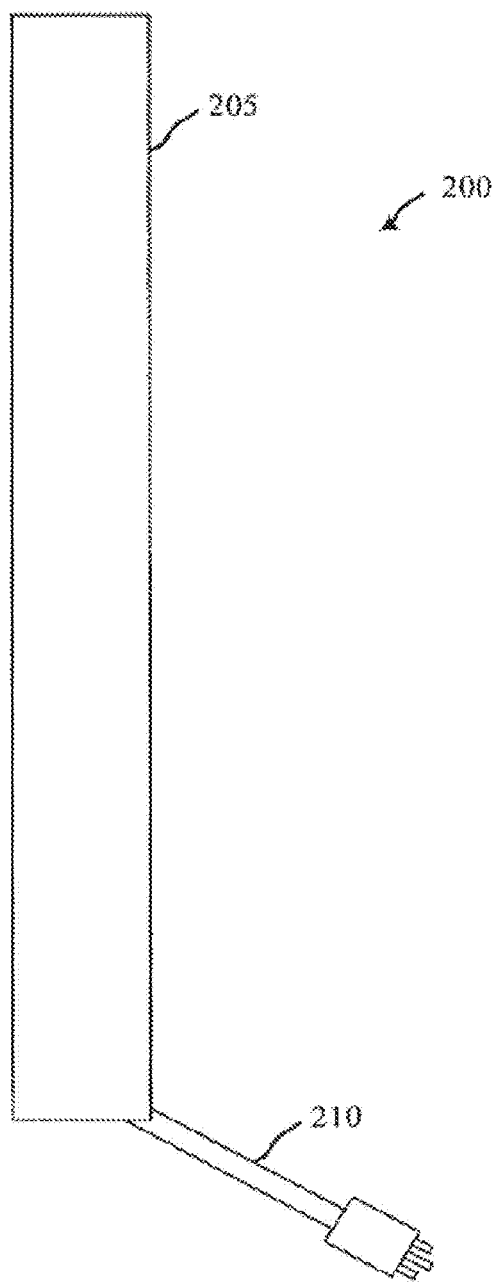
Figure 4:
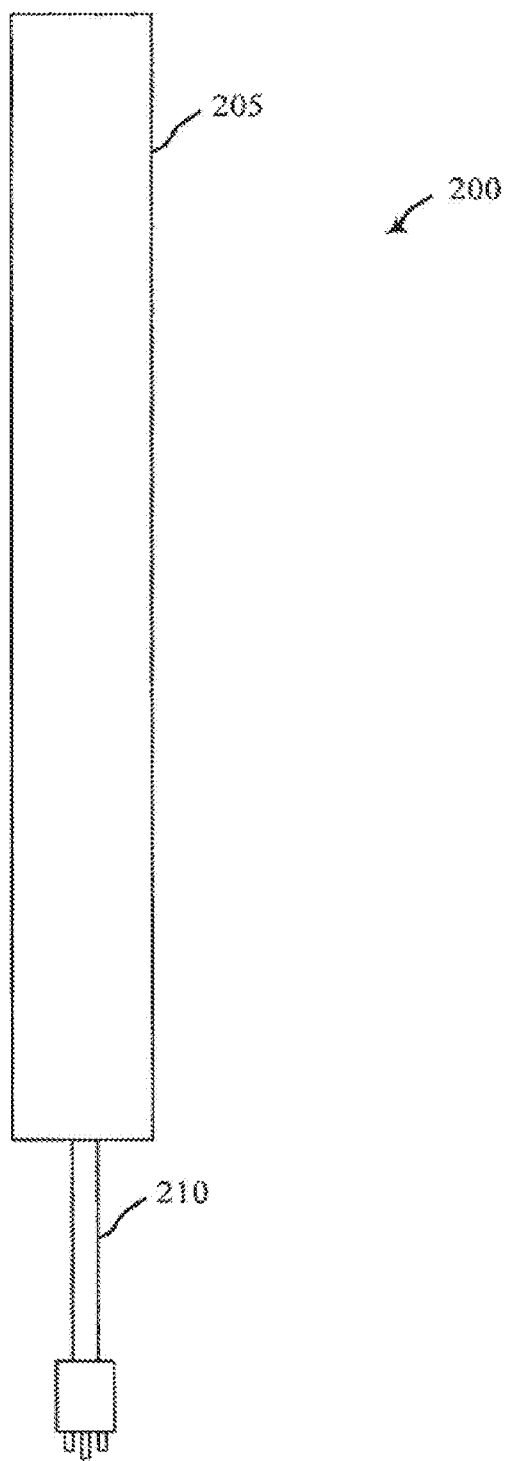

Referring now to FIGS. 2-4, a PDU 200 having an input cord assembly of various embodiments is described. The PDU 200 comprises a PDU housing 205 and an input power cord 210. These figures illustrate a side view of the PDU 200, which may include a number of outlets on a front and/or rear face thereof. FIG. 2 illustrates input power cord 210 extending away from the PDU housing 205 at about a 90 degree angle relative to the longitudinal axis of the PDU housing 205. FIG. 3 illustrates input power cord 210 extending away from the PDU housing 205 at about a 45 degree angle relative to the longitudinal axis of the PDU housing 205. Finally, FIG. 4 illustrates input power cord 210 extending away from the PDU housing 205 in a direction parallel to the longitudinal axis of the PDU housing 205.

Figure 5:
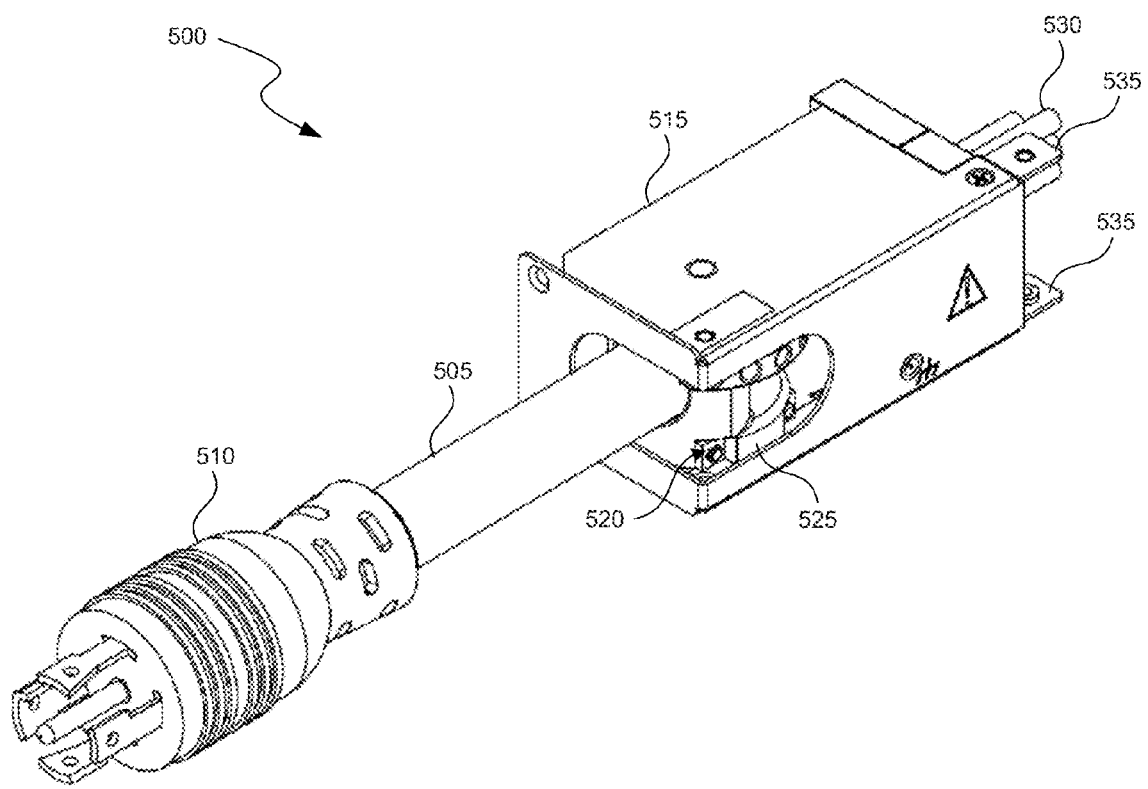
FIGS. 5-7 illustrate several views of an input cord swivel assembly in accordance with various embodiments.
Figure 6:
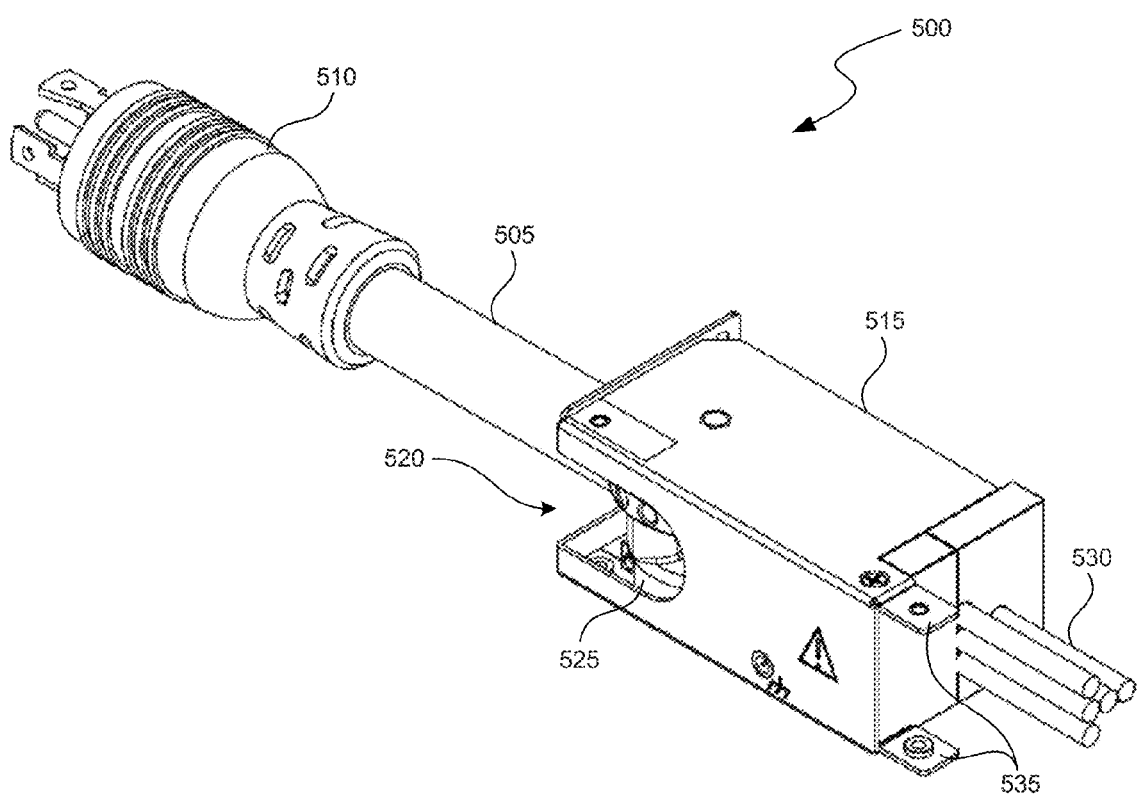
Figure 7:
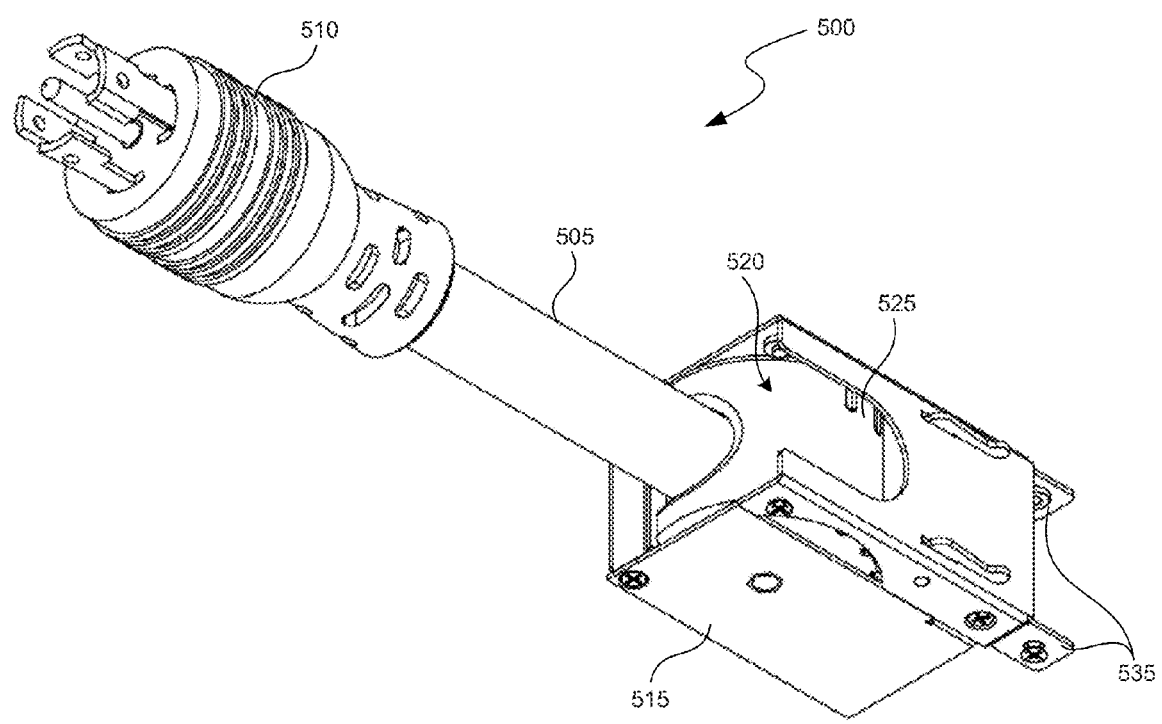

The embodiments illustrated in FIGS. 5-7 show an input cord assembly implemented as an input cord module 500. The input cord module 500 may include a swivel or pivot assembly that allows input cord 505 to be manipulated into several different positions. Input cord 505 may include a plug assembly 510 that may be plugged into a receptacle of a power source. It will be understood, however, that other configurations of input power cord 505 and plug 510 may be used, such as different plug configurations or hard wiring of conductors of the input cord 505 to an input power source. The input cord module 500 includes a module housing 515 which has an opening 520 through which the input power cord 505 extends. Power cord 505 is connected to a rotational member 525, which may be rotated relative to the housing 515. Conductors 530 extend from the housing 515, and may be coupled with other components of a PDU. In the illustrations of FIGS. 5-7 the input cord module 500 includes module connectors 535 that may be coupled with complementary receiving members of other modules that are assembled to form a PDU. In some embodiments, conductors 530 are coupled with the input cord 505 and are provided with sufficient slack within the housing 515 to allow for rotation of the rotational member 525 through 90 degrees of travel. It will be understood, however, that larger or smaller ranges of rotation for the input cord 505 may be accommodated. The power input cord 505 and plug 510 may have numerous different configurations, as will be readily recognized by one of skill in the art. For example, the input cord 505 and plug 510 may provide a polyphase connection to a power source, such as a three-phase power source. In some embodiments, a PDU may have dual power inputs, with each of the power inputs provided with an input cord module 500. The exit point of the power cord 505 from the rotating input cord module 500 may be oriented such that it minimizes the movement of the wires within the power distribution unit. This may be done by passing the input power cord through the rotational member 525 perpendicular to and laterally offset from a rotational axis of the rotational member 525 to reduce strain on the conductors caused by displacement of the input power cord from a first position to a second position. This is advantageous in that it allows the apparatus to be made smaller, and puts less strain on the point of connection where the wires attach to a power distribution unit. The module 500 may also serve as 'strain relief' for the power cord 505, which is associated with safety requirements of a power distribution unit. The module 500, according to some embodiments, may accommodate a range of power cord diameters, by using inserts within the rotational member 525 to effectively reduce the diameter of the connection. Using relatively small, low cost inserts to achieve the range of diameters provides the ability to provide a unique rotational apparatus for each input cord diameter.

Figure 8:
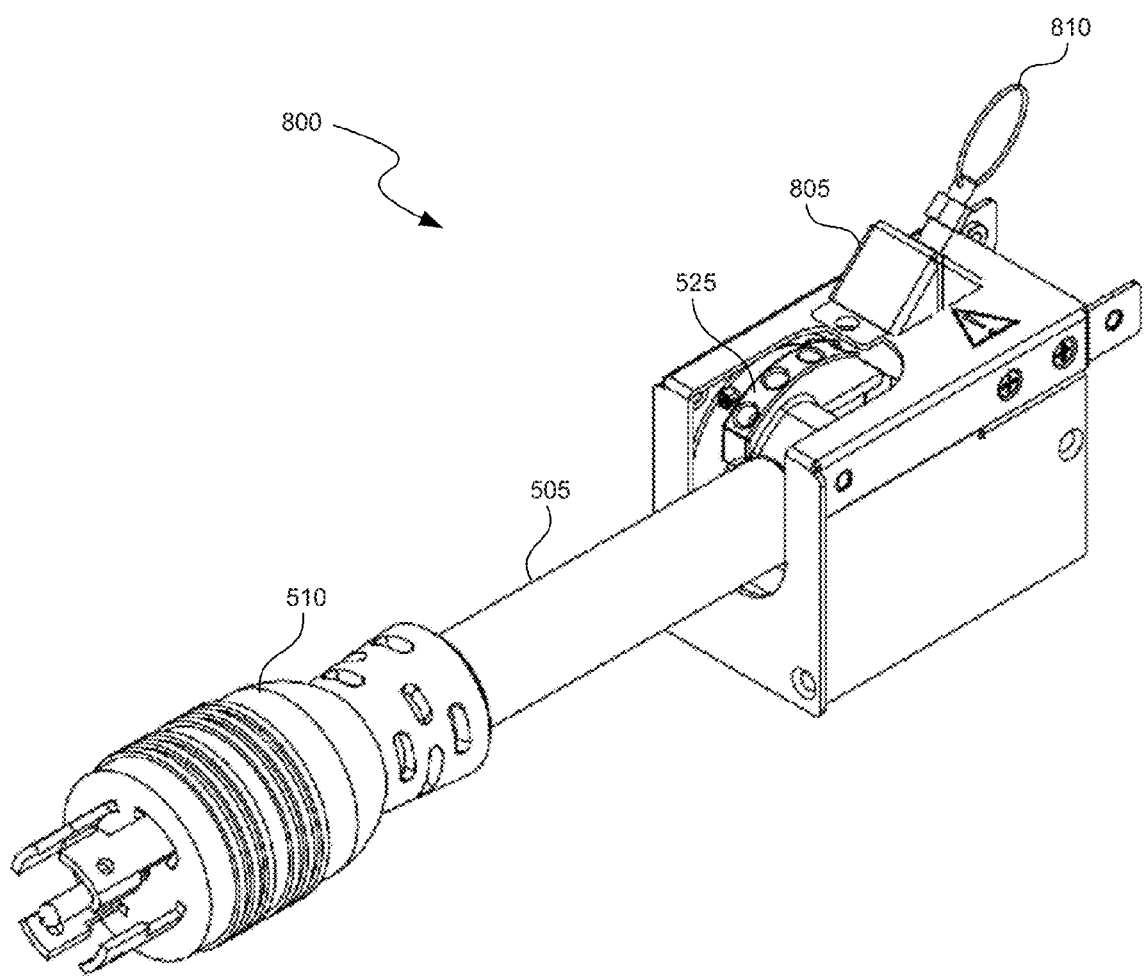
FIG. 8 illustrates an input cord swivel assembly in accordance with various embodiments.

FIG. 8 illustrates an input cord module 800, according to another embodiment. As illustrated, the input cord module 800 includes a locking mechanism 805 and a pull member 810. The pull member 810 may be configured to feed through the locking mechanism 805 to engage apertures in rotational member 525. By engaging the apertures, the pull member 810 latches or locks rotational member 525 in a position to secure input cord 505 at specific angles relative to the housing. In such a manner, the input power cord 505 may be held relatively securely in a predetermined position. Pull member 810 provides the ability to change input power cord positions in a PDU without requiring tools.

Figure 9:
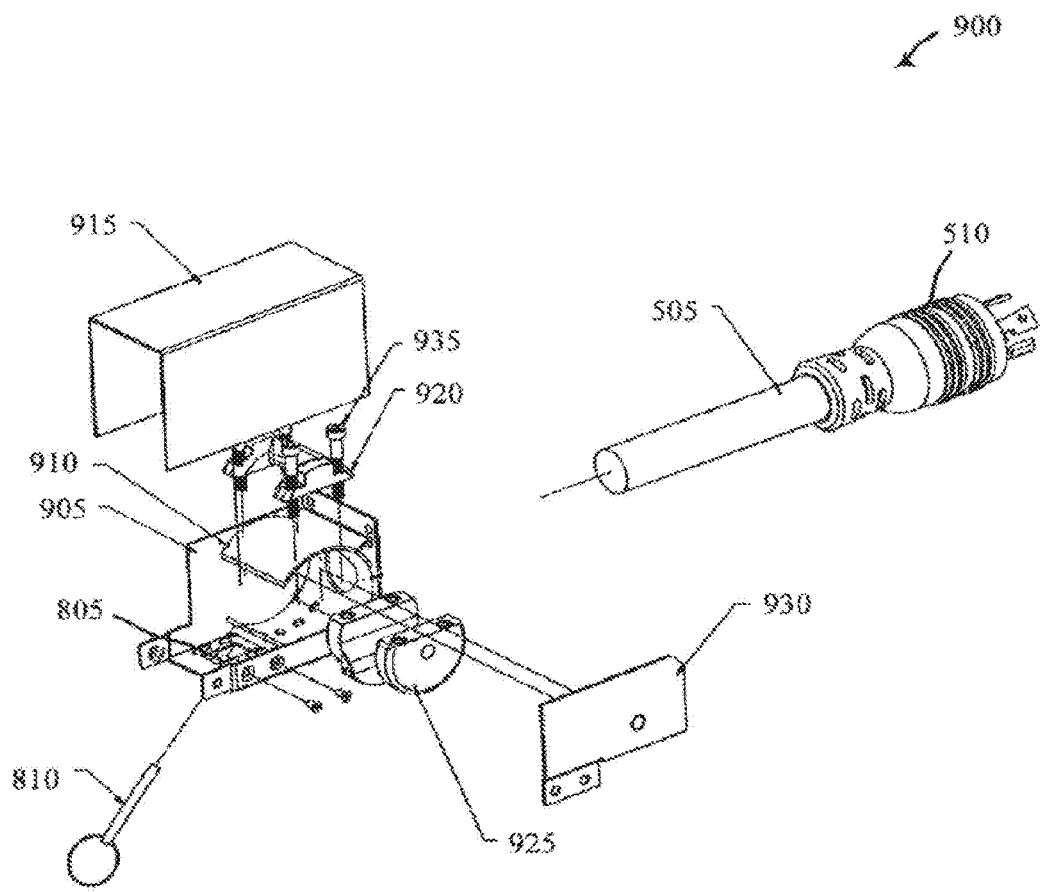
FIG. 9 illustrates another input cord swivel assembly in accordance with various embodiments.

With reference to FIG. 9, an input cord module 900 of still other embodiments is described. The input cord module 900 includes a locking mechanism 805 and the pull member or pin 810 that may engage with holes or cavities in the swivel lower housing 925 to secure input cord 505 at specific angles relative to a PDU housing. In such a manner, the input power cord 505 may be held relatively securely in a predetermined position. According to some embodiments, the swivel lower housing 925 has holes to allow for five locked positions of the input cord 505, each position being approximately 22.5 degrees from adjacent positions. In the illustration of FIG. 9, the input cord module also includes a main enclosure member 905, a dust shield 910, an enclosure cover 915, a swivel upper housing 920, the swivel lower housing 925, and an enclosure plate 930. Each of these items is assembled to form input cord module 900, which can be an assembly of discrete components. In this embodiment, dust shield 910 serves to prevent foreign objects and/or internal components from passing between the module 900 and an adjacent portion of the PDU, which could result in safety or functionality concerns. Such a shield 910 allows the module 900 to be relatively compact while also serving to prevent passage of loose or molten materials from the PDU, for example, in the event of a catastrophic failure. Enclosure cover 915 serves as a housing, or a portion of a housing for the module 900. Swivel upper and lower housings 920 and 925 may be secured together through hex screws 935, for example, to compress the power cord 505 between the assembled swivel upper and lower housings 920 and 925. Enclosure plate 930 may be assembled with the main enclosure member 905, as illustrated. Similarly as discussed above, the module 900 may be coupled with a PDU housing, or with other modules that may be assembled to form a PDU.

According to some embodiments, the present disclosure also provides a method for assembling a power distribution unit. The method may be performed during initial assembly of a power distribution unit, such as the power distribution unit of FIG. 1, or may be a final portion of an assembly process, in which an input may be assembled with a PDU based on a particular customer's needs related to input power cord size, plug type, etc. In such embodiments, a housing may be provided that has an opening there through. A rotational member, such as rotational member 525, may be rotatably secured within the housing. A power cord may then be secured within the housing and coupled with the rotational member. When secured within the housing, the power input cord may extend through the opening, and the rotational member may be rotated into multiple different orientations relative to a longitudinal axis of the housing and thereby allow the power input cord to exit the housing at different angles. In some embodiments, a locking mechanism may also be coupled with the housing and with the rotational member. Such a locking mechanism may secure the rotational member at one of two or more different orientations within the housing, and may include, for example, a latch that may be secured with the rotational member. A barrier may also be secured at a first end of the housing adjacent to other portions of a power distribution unit, and may act to prevent passage of objects or materials through the first end. Furthermore, in some embodiments, one or more shims may be inserted into the rotational member to reduce an effective width of the rotational member to accommodate a range of power cord diameters.

Figure 10:
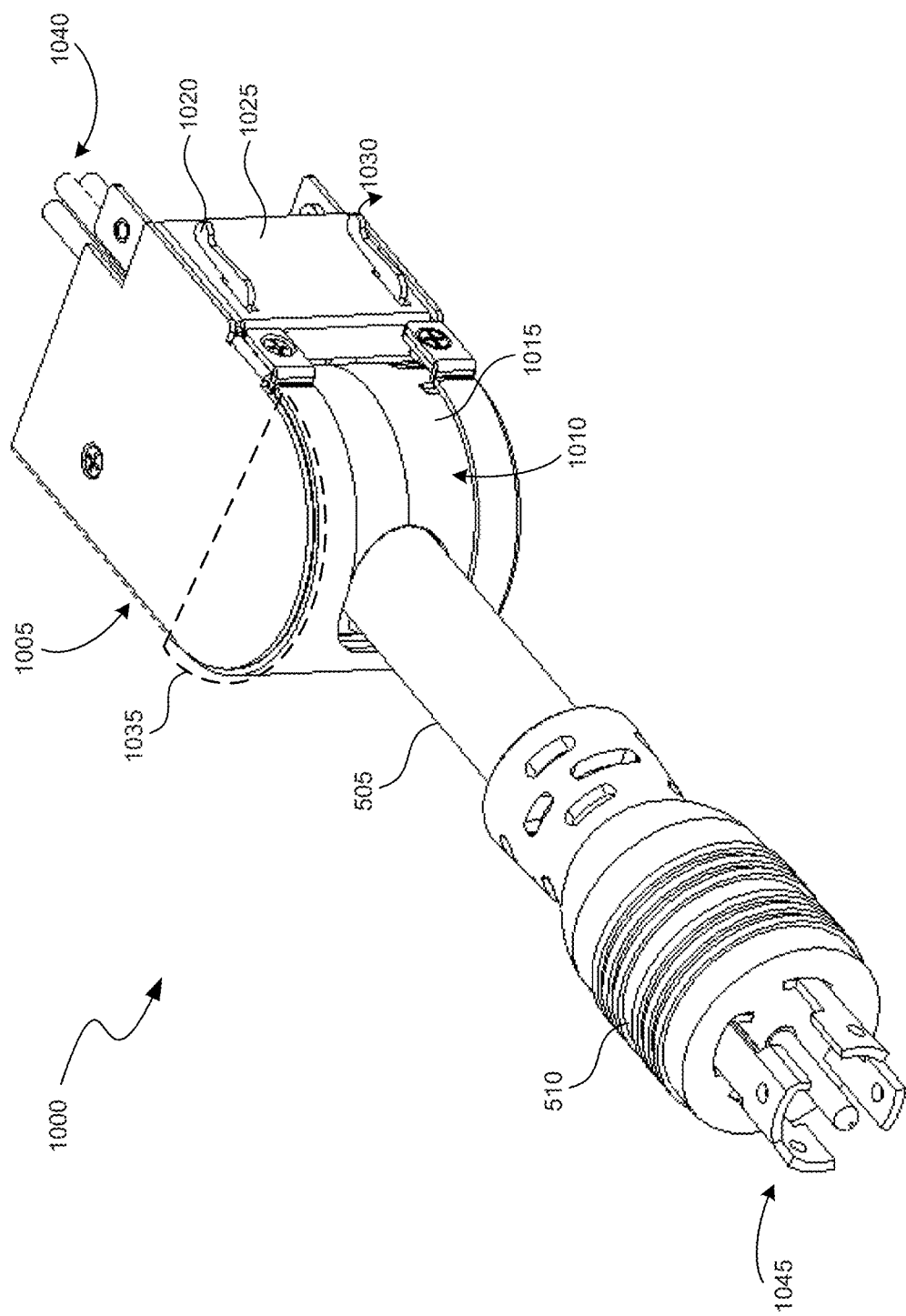
FIG. 10 illustrates an input cord swivel assembly with another locking mechanism in accordance with various embodiments.

FIG. 10 illustrates an input cord module 1000 that includes a cord position locking mechanism, in accordance with another embodiment. The input cord module 1000 can be coupled to an end of a PDU, e.g., PDU 65 or PDU 200, to electrically couple the PDU to a power source of, for example, a server farm. The input cord module 1000 enables a user to be able to manipulate, position, or pivot an input power cord into any one of a number of locked positions, with respect to a longitudinal axis of the PDU. In other words, the input power cord enables a user to change the angle of incidence of the input power cord, with respect to the longitudinal axis of the PDU. To enable repositioning of the input power cord, the input cord module 1000 includes the input power cord 505, the plug or plug assembly 510, and a body 1005.

The body 1005 may include any one of a number of locking mechanisms to enable the input power cord 505 to be slidably, pivotably, and/or rotatably repositioned, with respect to the body 1005. To accomplish this, the body 1005 may include an opening 1010 that exposes at least part of a cylinder 1015. The cylinder 1015 may be clamped around or otherwise mated to the input power cord 505. When unlocked or released, the cylinder 1015 may rotate within the opening 1010, allowing the input power cord 505 to pivot through positions within the opening 1010. Additional details regarding how an embodiment of the locking mechanism may be implemented are provided below in connection with FIG. 13.

The body 1005 may also include one or more fingers or extending members 1020, configured to operate a locking mechanism internal to the body 1005. According to various implementations, applying effort to one or both of the extending members 1020 results in unlocking or releasing the cylinder 1015. The body 1005 can be configured to release the cylinder 1015 in response to pressing at least one of the extending members 1020 or in response to lifting at least one of the extending members 1020. For example, the body 1005 can be configured to release the cylinder 1015 in response to pivoting one end of the extending member 1020 away from a surface 1025, in the direction of an arrow 1030. The body 1005 can additionally or alternatively be configured to release the cylinder 1015 in response to sliding all or part of at least one of the extending members 1020: towards the input power cable 505, away from the input power cable 505, towards the other extending member 1020, and/or away from the other extending member 1020.

The body 1005 may be partially contoured to the shape of the cylinder 1015 to seal the internal compartment of the body 1005 from the environment. For example, a part of the body 1005 that is adjacent to the input cord 505 may have a curved, bull-nosed, or arcuate end 1035. The arcuate end 1035 may provide a seal from external moisture, liquid, and/or debris that can corrode, electrically short, or otherwise interfere with the operation of the PDU to which the input cord module 1000 is attached. The arcuate end 1035 may also provide a safety seal that prevents conductive objects or body parts from entering an internal compartment of the body 1005 to protect a user or installer or the PDU to which the input cord module 1000 is attached. Furthermore, the arcuate end 1035 may provide a seal that protects the environment from molten components, fire, and/or electrical arcing that can originate from inside the input cord module 1000.

Figure 11:
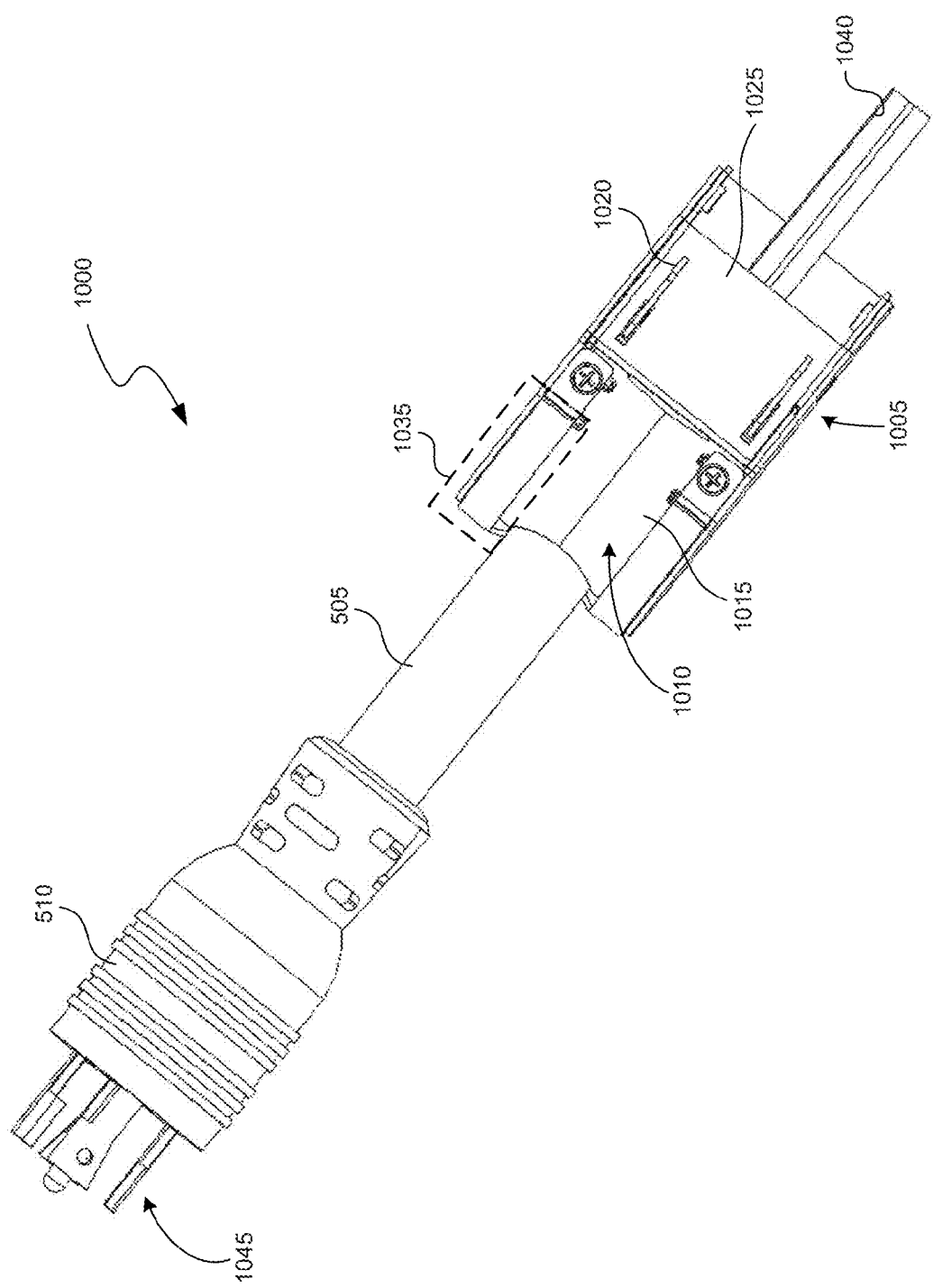
FIGS. 11-12 illustrate additional views of the input cord swivel assembly of FIG. 10.
Figure 12:
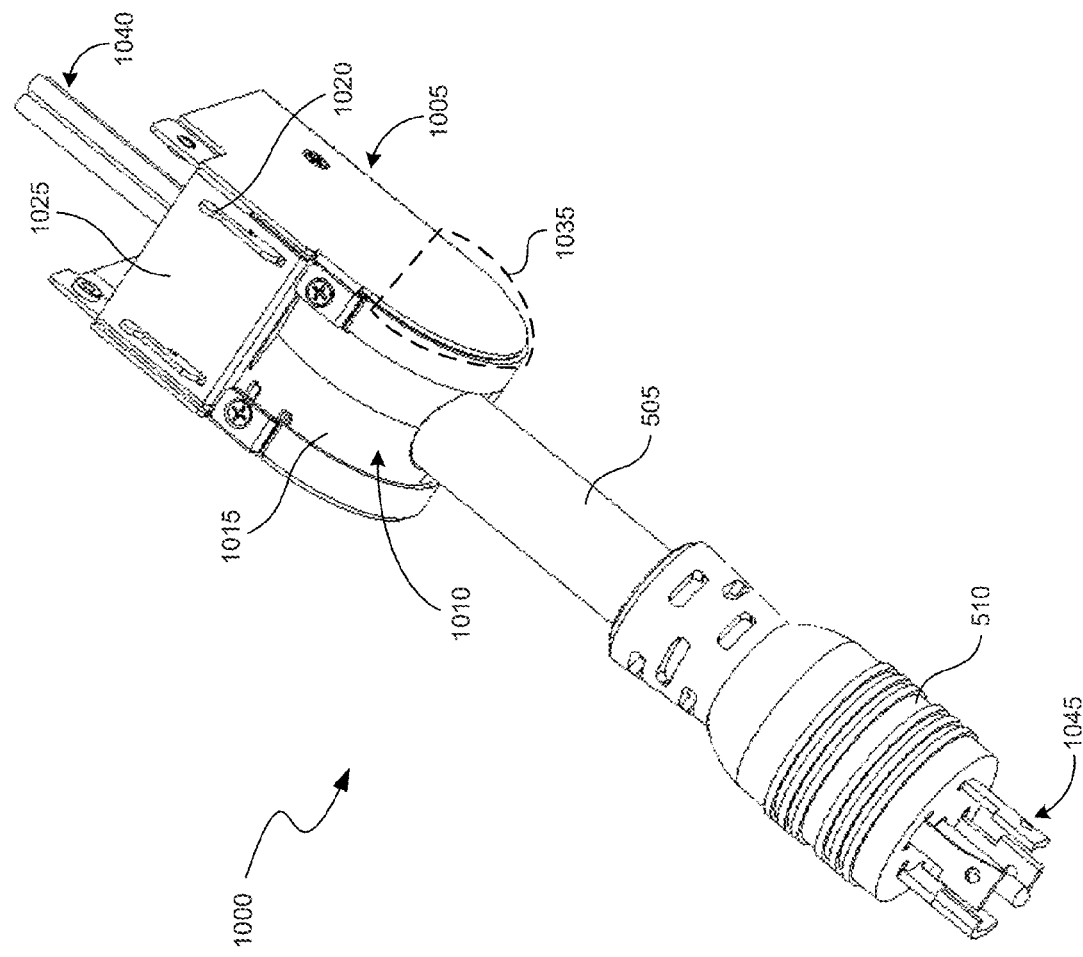

FIGS. 11 and 12 illustrate additional views of the input cord module 1000. From FIGS. 11 and 12, it can be seen that the input cord module 1000 receives the input cord 505 from the arcuate end 1035 and provides conductors 1040 on another side for electrically coupling the PDU to the conductive prongs 1045.

Figure 13:
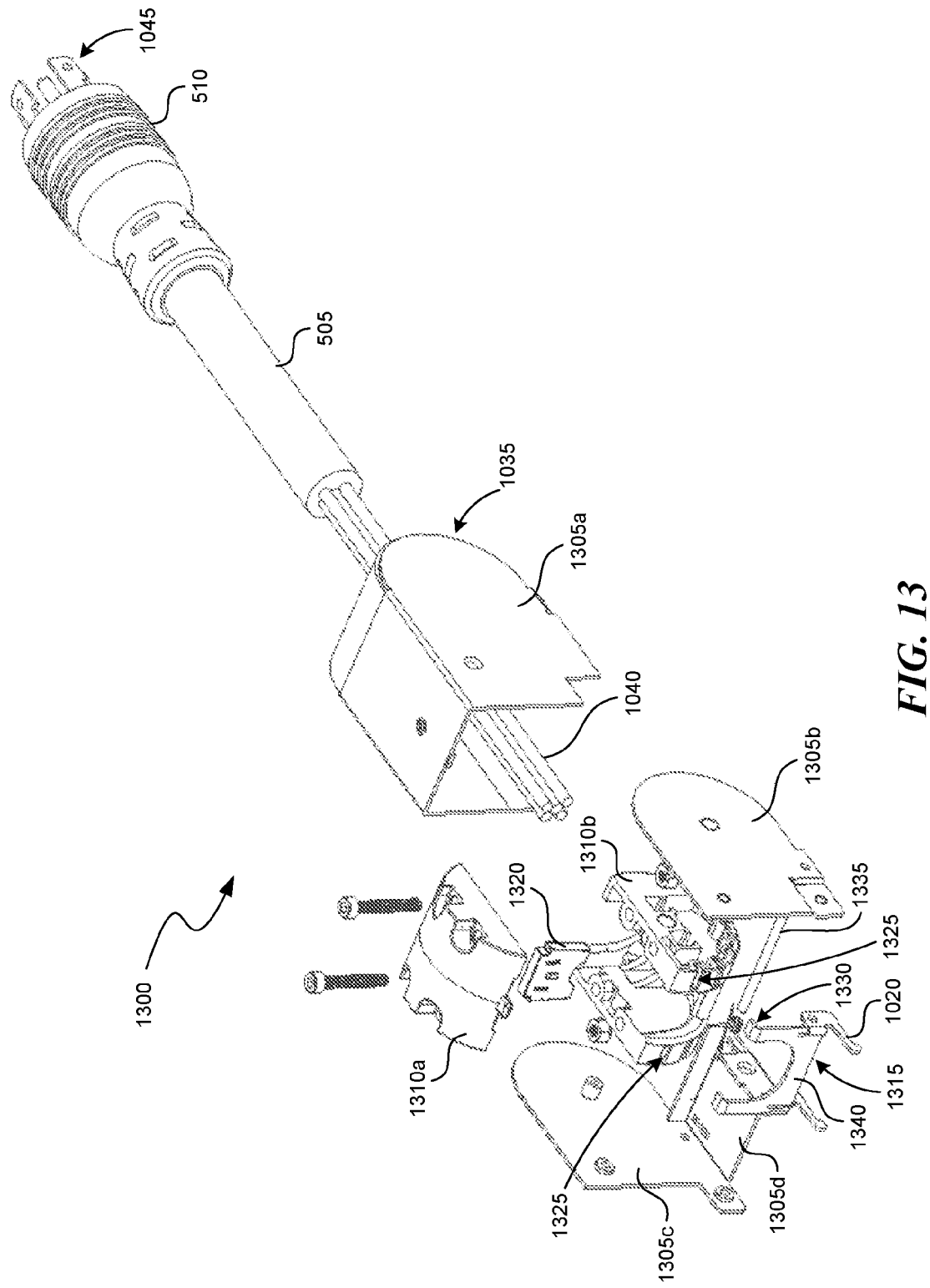
FIG. 13 illustrates an exploded view of the input cord swivel assembly of FIG. 10 in accordance with various embodiments.

FIG. 13 illustrates an exploded view of an input cord module 1300, according to an embodiment. The input cord module 1300 represents one of various potential implementations of the input cord module 1000. In addition to the previously disclosed components, the input cord module 1300 includes a housing 1305, a cylinder 1310 (inclusive of 1310a, 1310b), and a lever 1315.

The housing 1305 may include one or more sections for sealing and providing structural integrity to the body 1005 of the input cord module 1300. The housing 1305 may manufactured from one or more polymers or plastics, other non-conductive materials, or one or more conductive materials, or a combination thereof (e.g., polymer-coated aluminum). The housing 1305 may be a single unit that or may comprise several plates or sections 1305a, 1305b, 1305c, 1305d (accumulatively 1305). The housing 1305 may include the arcuate end 1035 to provide various sealing advantages, as described above.

The cylinder 1310 may be configured to be rotatably repositioned within the housing 1305 to support repositioning the input power cord 505. The cylinder 1310 may include two sections, an upper cylinder section 1310a and a lower cylinder section 1310b. The upper cylinder section 1310a may join with the lower cylinder section 1310b to provide a clamping mechanism for securing the input power cord 505 and/or the conductors 1040 between the upper cylinder section 1310a and the lower cylinder section 1310b. For example, the upper cylinder section 1310a and the lower cylinder section 1310b may apply pressure to the input power cord 505 and/or the conductors 1040 using a clamp gate 1320 that is trapped or secured within the cylinder 1310. In a preferred embodiment, the clamp gate 1320 is used to secure the input power cord 505.

The lower cylinder section 1310b can include several notches or crenels 1325 around a perimeter of the lower cylinder section 1310b to provide a mechanism for securing the cylinder 1310. The notches 1325 may be shaped, machined, manufactured or formed to receive one or more parts of the lever 1315. The notches 1325 may engage with the lever 1315 while the extending members 1020 are in a first or neutral position, to prevent the cylinder 1310 from rotating. The notches 1325 may disengage from the lever 1315 while the extending member 1020 are in a second or activated position, to enable to the cylinder 1310 to rotate between multiple positions. The cylinder 1310 may include several notches 1325, e.g., 100, to provide a large number of locking positions, or the cylinder 1310 may include a few notches, e.g., 8, to provide less locking positions, in accordance with various embodiments. While FIG. 13 depicts the lower cylinder section 1310b having the notches 1325, alternative implementations of rotation resists or locking mechanisms may include holes, grooves, or a high friction surface around the cylinder 1310. Although, in the illustrated embodiment, the lower cylinder section 1310b includes the notches 1325, in alternative embodiments, the upper cylinder section 1310a, the entire cylinder 1310, and/or other parts of the cylinder 1310 can be manufactured to include the notches 1325 or other locking mechanisms.

The lever 1315 can be manipulated by a user to engage or disengage with the cylinder 1310. The lever 1315 can include the fingers or extending members 1020 and hooks or tongues 1330. The extending members 1020 can provide a low-profile mechanism for applying effort to the lever 1315 or for otherwise operating the lever 1315. When a user operates (e.g., pulls, lifts, depresses) one side of the extending members 1020, the lever 1315 may pivot about an axle 1335 to disengage or engage the tongues 1330 with the notches 1325. The axle 1335 may be supported by one or more sections of the housing 1305 (e.g., 1305b, 1305c) to enable the lever 1315 to engageably pivot to and from the cylinder 1310. In addition to the extending members 1020 and the tongues 1330, the lever 1315 may also include a lever arm 1340 that couple the extending members 1020 to the tongues 1330. The lever arm 1340 may also include an aperture or partial opening that allows the conductors 1040 or the input power cord 505 to pass through the lever 1315. While two extending members 1020 and two tongues 1330 are illustrated, more or less than the number shown may also be used, according to alternate implementations.

A few embodiments of locking mechanisms have been described above, but additional embodiments may also be used to selectively secure and release the cylinder 1015 or 1310. For example, as alternatives to the pull-pin or pull member mechanism of FIG. 8 and the level mechanism of FIGS. 10-13, the input cord modules 1000, 1300 could employ other cylinder locking/release mechanisms, such as sliders, push buttons, push levers, squeeze mechanisms, a magnetic key or device, an electromagnet, an electromagnetic mechanism, knobs, or the like. As will be discussed below and shown in FIG. 14, any one or more of these operating mechanisms can also be used to cause the input power cords to swivel around a longitudinal axis of a PDU rather than pivot away from the longitudinal axis of the PDU.

Figure 14:
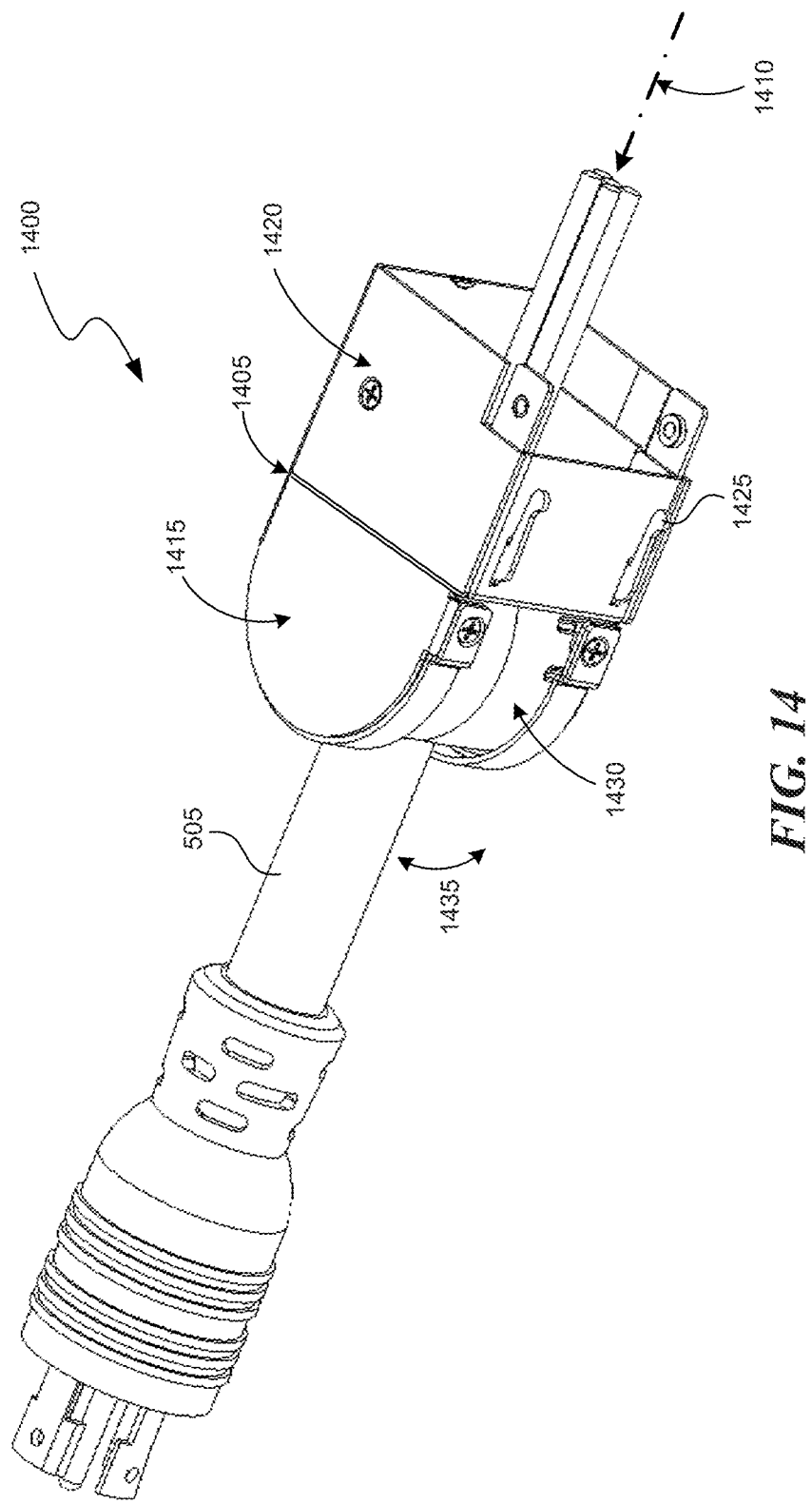
FIG. 14 illustrates an input cord swivel assembly having an input cord that is capable of pivotal and rotational positioning in accordance with various embodiments.

FIG. 14 illustrates an input cord module 1400 that enables the input power cord 505 to both pivot and swivel, with respect to a longitudinal axis of a PDU. The input cord module 1400 may include a swivel joint 1405 that enables the input power cord 505 to swivel or axially rotate about the longitudinal axis 1410 of the PDU to which the input cord module 1400 may be attached. The swivel joint 1405 may include one or more lubricated rubber bushings, bearings, ball-socket combinations, and cylinders to enable a cord section 1415 of the input cord module 1400 to axially rotate independent from PDU section 1420 of the input cord module 1400.

The swivel joint 1405 can be configured to freely rotate, or the swivel joint 1405 can be selectively secured from rotating. For example, a release mechanism 1425 may be a lever or may be part of a lever that is configured to unlock or release the swivel joint 1405 to enable the input cord 505 to axially rotate. Other release mechanisms may also be used, such as slides, buttons, squeeze mechanisms, and magnetic keys. In some implementations, operation of the release mechanism 1425 enables the input power cord 505 to both axially rotate around the longitudinal axis 1410 in addition to pivoting within an opening 1430 (e.g., along the general direction of the arrows 1435). Pivoting the input power cord 505 with respect to the longitudinal axis 1410 of the PDU may allow a user to change the angle of incidence of the input cord from zero degrees to, for example, 90 degrees, or anywhere in between.

Embodiments described herein provide several benefits relative to PDUs having a single fixed position for an input power cord. For example, embodiments of the disclosure may simplify manufacturing and purchasing because angle of incidence of the power cord can be adjusted according to a customer's needs. This feature simplifies manufacturing and purchasing because customizing incident angle of a power cord can require order-specific parts and can require the client to determine the egress angle prior to submitting an order for the PDU. Thus, through the disclosed embodiments, assembly time and cost may be reduced, and reliability may be increased. Furthermore, embodiments may be used to produce a product that may require a smaller packaging footprint than products without such a feature. PDUs having multi-position input cords may also be more versatile and usable in a wider range of applications as compared to PDUs having a single fixed position for an input power cord.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

We claim:

1. A power input apparatus, comprising:
   an input power cord that includes multiple conductors for providing power to a power distribution device from a power source;
   a housing having an aperture extending through a front portion and a generally orthogonal end portion of the housing through which the input power cord passes from an exterior of the power distribution device to an interior of the power distribution device, wherein the end portion is substantially perpendicular to a longitudinal axis of the power distribution device; and
   a rotational member coupled to the housing and secured to the input power cord, including first and second sections configured to apply pressure to the input power cord when the sections are joined together;
   wherein the rotational member is configured to enable the input power cord to pivot between a first position where the input power cord is substantially aligned with the longitudinal axis of the power distribution device and a second position where the input power cord is substantially perpendicular to the longitudinal axis.

2. The apparatus of claim 1, further comprising: an input power cord release mechanism coupled to the housing and releasably coupled to the rotational member to enable the rotational member to selectively rotate within the housing.

3. The apparatus of claim 2, wherein the input power cord release mechanism includes a pin that is engageable with the input power cord release mechanism.

4. The apparatus of claim 3, wherein the rotational member includes one or more notches or apertures that are engageable with at least a portion of the pin to secure the rotational member from rotation and to secure the input power cord from pivoting.

5. The apparatus of claim 1, wherein the exit point of the input power cord from the rotational member is oriented such that it minimizes movement of the conductors within the power distribution device.

6. The apparatus of claim 1, wherein the input power cord comprises a polyphase power input cord.

7. The apparatus of claim 1, wherein the housing comprises modular mounting tabs that may be secured to another module of a power distribution device.

8. The apparatus of claim 1, further comprising:
   a barrier located at a first end of the housing that is distal to other portions of the power distribution device, the barrier configured to prevent passage of objects or materials through the first end.

9. A power distribution unit, comprising:
   a power distribution unit housing;
   a plurality of power outlets disposed in at least one face of the power distribution unit housing; and
   a power input module, comprising:
   an input power cord that includes multiple conductors for providing power to the power distribution unit from a power source;
   a power input module housing that is mateable with the power distribution unit housing, the power input module housing having an aperture extending through generally orthogonal front and end portions of the input module housing through which the input power cord passes from an exterior of the power distribution unit to an interior of the power distribution unit, wherein the end portion is substantially perpendicular to a longitudinal axis of the power distribution unit; and
   a rotational member coupled to the power input module housing and secured to the input power cord, including first and second sections configured to apply pressure to the input power cord when the sections are joined together;
   wherein the rotational member is configured to enable the input power cord to pivot between a first position where the input power cord is substantially aligned with the longitudinal axis of the power distribution unit and a second position where the input power cord is substantially perpendicular to the longitudinal axis.

10. The power distribution unit of claim 9, wherein the power input module further comprises:
    an input power cord release mechanism coupled to the power input module housing and releasably coupled to the rotational member to enable the rotational member to selectively rotate within the power input module housing.

11. The power distribution unit of claim 10, wherein the input power cord release mechanism includes a pin that is engageable with the rotational member.

12. The power distribution unit of claim 11, wherein the rotational member includes one or more notches or apertures that are engageable with at least a portion of the pin to secure the rotational member from rotation and to secure the input power cord from pivoting.

13. The apparatus of claim 1, further comprising a clamp gate positioned between one of the first and second sections and the input power cord.

14. The apparatus of claim 2, wherein the rotational member includes one or more pairs of notches, and wherein the release mechanism includes a lever having a pair of hooks configured to engage the one or more pairs of notches.

15. The power distribution unit of claim 9, further comprising a clamp gate positioned between one of the first and second sections and the input power cord.

16. The power distribution unit of claim 10, wherein the rotational member includes one or more pairs of notches, and wherein the release mechanism includes a lever having a pair of hooks configured to engage the one or more pairs of notches.

17. A power distribution unit, comprising:
    a power distribution unit housing having a longitudinal axis;
    one or more power outlets disposed in the power distribution unit housing;
    an input power cord for providing power to the one or more power outlets; and
    a rotational member coupled to the power distribution unit housing and including first and second sections configured to apply pressure to the input power cord when the sections are joined together, thereby securing the input power cord to the rotational member;
    wherein the rotational member is configured to enable the input power cord to pivot with respect to the power distribution unit housing between a first position where the input power cord is substantially aligned with the longitudinal axis and extends through an end portion of the power distribution unit housing, and a second position where the input power cord is oriented at an angle of approximately 90 degrees with respect to the longitudinal axis and extends through a front portion of the power distribution unit housing.

18. The power distribution unit of claim 17, further comprising a clamp gate positioned between one of the first and second sections and the input power cord.

19. The power distribution unit of claim 17 further comprising a latch coupled to the power distribution unit housing and releasably engaged with the rotational member to enable the rotational member to selectively rotate with respect to the power distribution unit housing.

20. The power distribution unit of claim 19, wherein the rotational member includes one or more pairs of notches, and wherein the latch includes a lever having a pair of hooks configured to engage the one or more pairs of notches.

21. A power input apparatus, comprising:
an input power cord that includes multiple conductors for providing power to a power distribution device from a power source;
a housing having an aperture extending through two generally orthogonal side portions of the housing through which the input power cord passes from an exterior of the power distribution device to an interior of the power distribution device;
a rotational member coupled to the housing and secured to the input power cord, including one or more notches or apertures and first and second sections configured to apply pressure to the input power cord when the sections are joined together, wherein the rotational member is configured to enable the input power cord to pivot within the aperture at least approximately 90 degrees away from a longitudinal axis of the power distribution device while the rotational member rotates within the housing; and
an input power cord release mechanism coupled to the housing including a pin that is engageable with the one or more notches or apertures to enable the rotational member to selectively rotate within the housing and to selectively secure the rotational member from rotation, thereby securing the input power cord from pivoting.

22. A power input apparatus, comprising:
an input power cord that includes multiple conductors for providing power to a power distribution device from a power source;
a housing having an aperture extending through two generally orthogonal side portions of the housing through which the input power cord passes from an exterior of the power distribution device to an interior of the power distribution device;
a rotational member coupled to the housing and secured to the input power cord, including one or more pairs of notches and first and second sections configured to apply pressure to the input power cord when the sections are joined together, wherein the rotational member is configured to enable the input power cord to pivot within the aperture at least approximately 90 degrees away from a longitudinal axis of the power distribution device while the rotational member rotates within the housing; and
an input power cord release mechanism coupled to the housing including a lever having a pair of hooks configured to releasably engage the one or more pairs of notches to enable the rotational member to selectively rotate within the housing.

23. A power distribution unit, comprising:
a power distribution unit housing;
a plurality of power outlets disposed in at least one face of the power distribution unit housing; and
a power input module, comprising:
an input power cord that includes multiple conductors for providing power to the power distribution unit from a power source;
a power input module housing that is mateable with the power distribution unit housing, the power input module housing having an aperture extending through two generally orthogonal side portions of the input module housing through which the input power cord passes from an exterior of the power distribution unit to an interior of the power distribution unit;
a rotational member coupled to the power input module housing and secured to the input power cord, including one or more notches or apertures and first and second sections configured to apply pressure to the input power cord when the sections are joined together, wherein the rotational member is configured to enable the input power cord to pivot within the aperture and away from a longitudinal axis of the power distribution unit housing while the rotational member rotates within the power input module housing; and
an input power cord release mechanism coupled to the power input module housing including a pin that is engageable with the one or more notches or apertures to enable the rotational member to selectively rotate within the power input module housing and to selectively secure the rotational member from rotation, thereby securing the input power cord from pivoting.

24. A power distribution unit, comprising:
a power distribution unit housing;
a plurality of power outlets disposed in at least one face of the power distribution unit housing; and
a power input module, comprising:
an input power cord that includes multiple conductors for providing power to the power distribution unit from a power source;
a power input module housing that is mateable with the power distribution unit housing, the power input module housing having an aperture extending through two generally orthogonal side portions of the input module housing through which the input power cord passes from an exterior of the power distribution unit to an interior of the power distribution unit;
a rotational member coupled to the power input module housing and secured to the input power cord, including one or more pairs of notches and first and second sections configured to apply pressure to the input power cord when the sections are joined together, wherein the rotational member is configured to enable the input power cord to pivot within the aperture and away from a longitudinal axis of the power distribution unit housing while the rotational member rotates within the power input module housing; and
an input power cord release mechanism coupled to the power input module housing including a lever having a pair of hooks configured to releasably engage the one or more pairs of notches to enable the rotational member to selectively rotate within the power input module housing.

25. A power distribution unit, comprising: a power distribution unit housing; one or more power outlets disposed in the power distribution unit housing; an input power cord for providing power to the one or more power outlets; and a rotational member coupled to the power distribution unit housing and including one or more pairs of notches and first and second sections configured to apply pressure to the input power cord when the sections are joined together, thereby securing the input power cord to the rotational member;

wherein the rotational member is configured to enable the input power cord to pivot with respect to the power distribution unit housing and extend through a side portion of the power distribution unit housing at an angle of approximately 90 degrees with respect to a longitudinal axis of the power distribution unit housing; a latch coupled to the power distribution unit housing including a lever having a pair of hooks configured to releaseably engage the one or more pairs of notches to enable the rotational member to selectively rotate with respect to the power distribution unit housing.

26. A power input apparatus, comprising:
an input power cord that includes multiple conductors for providing power to a power distribution device from a power source;
a housing having an aperture extending through a front wall and a generally orthogonal end wall of the housing through which the input power cord passes from an exterior of the power distribution device to an interior of the power distribution device, wherein the end wall is substantially perpendicular to a longitudinal axis of the power distribution device; and
a rotational member coupled to the housing and secured to the input power cord, including first and second sections configured to apply pressure to the input power cord when the sections are joined together;
wherein the rotational member is configured to enable the input power cord to pivot between a first position where the input power cord is substantially aligned with the longitudinal axis of the power distribution device and a second position where the input power cord is substantially perpendicular to the longitudinal axis.

* * * * *